United States Patent
Hwang et al.

(10) Patent No.: US 11,833,932 B2
(45) Date of Patent: Dec. 5, 2023

(54) SEAT-SLIDING APPARATUS FOR VEHICLE

(71) Applicant: HYUNDAI TRANSYS INC., Chungcheongnam-do (KR)

(72) Inventors: Seong Jun Hwang, Gyeonggi-do (KR); Gyong Min Kim, Gyeonggi-do (KR); Sung Min Shim, Seoul (KR)

(73) Assignee: HYUNDAI TRANSYS INC., Seosan-si (KR)

( * ) Notice: Subject to any disclaimer, the term of this patent is extended or adjusted under 35 U.S.C. 154(b) by 374 days.

(21) Appl. No.: 17/398,506

(22) Filed: Aug. 10, 2021

(65) Prior Publication Data

US 2022/0063451 A1    Mar. 3, 2022

(30) Foreign Application Priority Data

Sep. 2, 2020 (KR) .................. 10-2020-0111585

(51) Int. Cl.
*B60N 2/07* (2006.01)
(52) U.S. Cl.
CPC ................. *B60N 2/0722* (2013.01)
(58) Field of Classification Search
None
See application file for complete search history.

(56) References Cited

U.S. PATENT DOCUMENTS

| | | | | |
|---|---|---|---|---|
| 6,688,574 B2* | 2/2004 | Okazaki | ............... | B60N 2/0705 248/424 |
| 7,314,204 B2* | 1/2008 | Kohmura | ............. | B60N 2/0705 248/430 |
| 7,971,920 B2* | 7/2011 | Jang | ........................ | B60N 2/123 296/65.01 |
| 8,469,328 B2* | 6/2013 | Nakamura | ........... | B60N 2/0705 248/424 |
| 9,463,716 B2* | 10/2016 | Hayashi | ............... | B60N 2/0705 |
| 10,759,309 B2 | 9/2020 | Flick et al. | | |

FOREIGN PATENT DOCUMENTS

| | | |
|---|---|---|
| DE | 102016212168 A1 | 1/2018 |
| FR | 2868364 A1 | 10/2005 |
| KR | 10-0371151 B1 | 1/2003 |
| WO | 2016/091614 A1 | 6/2016 |

OTHER PUBLICATIONS

The Extended European Search Report dated Oct. 21, 2021; Appln. No. 21190061.8.

* cited by examiner

*Primary Examiner* — Joseph D. Pape

(57) ABSTRACT

The present invention provides a seat-sliding apparatus for a vehicle. The seat-sliding apparatus includes a lower rail fixed to the vehicle, an upper rail, which is coupled to a seat and slides along the lower rail, a rail groove portion, which is formed in at least one surface of the lower rail and has therein a plurality of grooves, a tooth portion having teeth positioned between the grooves in the rail groove portion, a sloped portion, which is positioned at at least a portion of the rail groove portion and in which heights of the teeth of the tooth portion decrease toward a center of the rail groove portion from one end of the rail groove portion in a longitudinal direction, and a locking unit, which is positioned at the upper rail and is selectively engaged with the rail groove portion so as to hold the upper rail.

8 Claims, 2 Drawing Sheets

SEAT-SLIDING APPARATUS FOR VEHICLE

This application claims the benefit of Korean Patent Application No. 10-2020-0111585 filed on Sep. 2, 2020, the entireties of which are hereby incorporated herein by reference.

BACKGROUND

(a) Technical Field

The present disclosure relates to a seat-sliding apparatus for a vehicle. More particularly, it relates to a seat-sliding apparatus for a vehicle, which includes a rail groove portion configured to prevent generation of unpleasant sounds during movement of an upper rail.

(b) Background Art

Generally, a vehicular seat, which is intended to maintain the posture of a passenger sitting thereon in the optimal state, includes a seat back configured to support the upper body of the passenger and a seat cushion configured to support the lower body of the passenger, such as the hips and the thighs thereof.

The vehicular seat is provided with a seat rail, which is capable of sliding within a predetermined range in the anteroposterior direction of the vehicle body so as to adapt to the body type of a passenger.

As illustrated in FIG. 1, the seat rail includes a lower rail 10, which is fixedly mounted on the floor of the passenger compartment of the vehicle in the longitudinal direction of the vehicle body, and an upper rail, which is coupled to the lower rail so as to slide along the lower rail and to which a seat cushion is fixed.

The upper rail is configured so as to move along the lower rail and so as to be held at a desired location on the lower rail by means of a holding unit. In other words, the coupling between the lower rail and the upper rail is realized by a locking unit 20 positioned at the upper rail.

In order to ensure passenger safety, it is critical to provide the ability to lock the upper rail, which is coupled to a seat, to any location on the lower rail. Accordingly, there is continued demand for technology for improving the locking ability of the seat rail.

However, the above-mentioned conventional structure has a problem whereby unpleasant sounds are generated when the locking member moves through the location at which the locking member is held to the lower rail.

Furthermore, there is a problem whereby a passenger experiences an unpleasant sensation due to vibrations that are generated when the locking member is moved in the state in which the locking member is not completely coupled to the lower rail.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to solve the above-described problems associated with the prior art. An object of the present invention is to provide a seat-sliding apparatus for a vehicle, which does not generate unpleasant sounds when a locking unit is located at the end of the lower rail.

Another object of the present invention is to provide a seat-sliding apparatus for a vehicle that is capable of preventing a phenomenon, in which a portion of a locking unit is engaged with a rail groove portion, by virtue of a sloped portion.

The objects of the present invention are not limited to the above-mentioned objects, and other objects of the present invention, which are not mentioned above, will be clearly understood from the following descriptions of preferred embodiments and will be apparent from the preferred embodiments of the present invention. The above objects and other objects of the present invention are achieved by the means and combinations thereof disclosed in the claims.

In one aspect, the present invention provides a seat-sliding apparatus for a vehicle including a lower rail fixed to the vehicle, an upper rail, which is coupled to a seat and slides along the lower rail, a rail groove portion, which is formed in at least one surface of the lower rail and has a plurality of grooves, a tooth portion having teeth positioned between the grooves in the rail groove portion, a sloped portion, which is positioned at at least a portion of the rail groove portion and in which heights of the teeth of the tooth portion decrease toward a center of the rail groove portion from one end of the rail groove portion in a longitudinal direction, and a locking unit, which is positioned at the upper rail and is selectively engaged with the rail groove portion so as to hold the upper rail.

In a preferred embodiment, the sloped portion may be positioned at the end of the rail groove portion, and has a length corresponding to the length of the locking unit.

In another preferred embodiment, an end of the tooth portion positioned in the sloped portion may define an angle of 1.5 degrees with respect to the horizontal direction of the upper rail.

In still another preferred embodiment, a remaining portion of the rail groove portion excluding the sloped portion may have teeth of the same height.

In yet another preferred embodiment, the locking unit may be moved along the lower rail without being engaged with the rail groove portion in a zone corresponding to the sloped portion.

In still yet another preferred embodiment, the locking unit may include a locking plate, configured to be engaged with the rail groove portion, and a center pin, which is positioned at the locking plate and projects through the upper rail.

In a further preferred embodiment, the center pin may be moved by a lever positioned at the seat such that the locking plate is pressed by the center pin in linkage with manipulation of the lever, and thus the locking plate is disengaged from the rail groove portion.

In another further preferred embodiment, the seat-sliding apparatus may further include an elastic member for restoring the locking plate, which is pressed by the center pin, to the normal position thereof when manipulation of the lever is released.

Other aspects and preferred embodiments of the invention are discussed infra.

It is to be understood that the terms "vehicle", "vehicular", and other similar terms used herein are inclusive of motor vehicles in general, such as passenger automobiles including sports utility vehicles (SUV), buses, trucks, various commercial vehicles, watercraft including a variety of boats and ships, aircraft, and the like, and include hybrid vehicles, electric vehicles, plug-in hybrid electric vehicles, hydrogen-powered vehicles, and other alternative-fuel vehicles (e.g. fuels derived from resources other than petroleum). As referred to herein, a hybrid vehicle is a vehicle that has two or more sources of power, for example a vehicle powered by both gasoline and electricity.

The above and other features of the invention are discussed infra.

BRIEF DESCRIPTION OF THE DRAWINGS

The above and other features of the present invention will now be described in detail with reference to certain exemplary embodiments thereof, illustrated in the accompanying drawings which are given hereinbelow by way of illustration only, and thus are not limitative of the present invention, and wherein.

Figure 1:
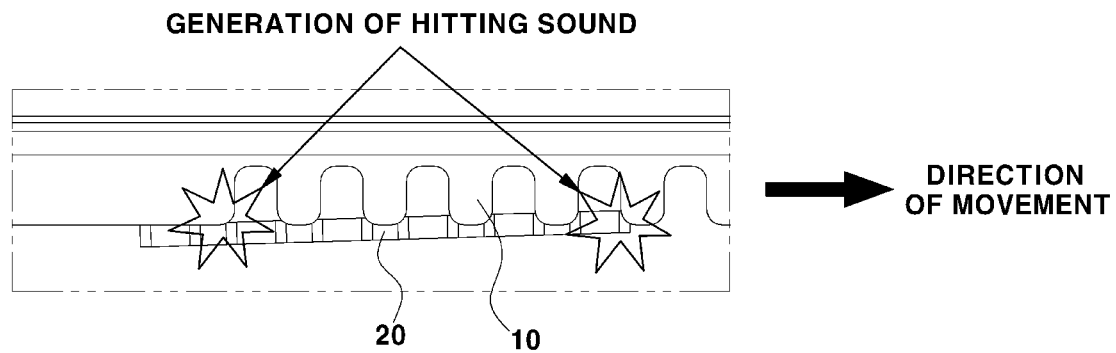
FIG. 1 is a side view illustrating a conventional seat-sliding apparatus for a vehicle.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes, will be determined in part by the particular intended application and use environment.

In the figures, the reference numbers refer to the same or equivalent parts of the present invention throughout the several figures of the drawing.

DETAILED DESCRIPTION

Hereinafter, reference will now be made in detail to various embodiments of the present invention, examples of which are illustrated in the accompanying drawings and described below. While the invention will be described in conjunction with exemplary embodiments, it is to be understood that the present description is not intended to limit the invention to those exemplary embodiments. On the contrary, the invention is intended to cover not only the exemplary embodiments, but also various alternatives, modifications, equivalents and other embodiments that may be included within the spirit and scope of the invention as defined by the appended claims.

Hereinafter, embodiments of the present invention will be described in detail with reference to the accompanying drawings. The embodiments of the present invention may be modified into various forms, and the scope of the present invention should not be construed as being limited to the following embodiments. These embodiments are provided so that this disclosure will be thorough and complete, and will fully convey the scope of the disclosure to those skilled in the art.

The term "part" or "unit" means a unit for performing at least one function or action, and may be realized by hardware or a combination of hardwares.

The term "height" used herein may be construed as meaning the length in the height direction of a vehicle relative to the interior floor of the vehicle on which a lower rail 100 is disposed, or may be construed as meaning the length in the height direction of the vehicle relative to the lower rail.

Hereinafter, an embodiment of the present invention will be described in detail with reference to the accompanying drawings. In the description based on the accompanying drawings, the same or similar elements are assigned the same reference numerals, and a redundant description thereof is omitted.

The present invention relates to a seat-sliding apparatus for a vehicle, which is provided with a locking unit 200, which is moved along a lower rail 100 fixed to a vehicle body, and with an upper rail 300 so as to reduce the generation of unpleasant sounds and to prevent partial fixation during movement of a seat.

Figure 2:
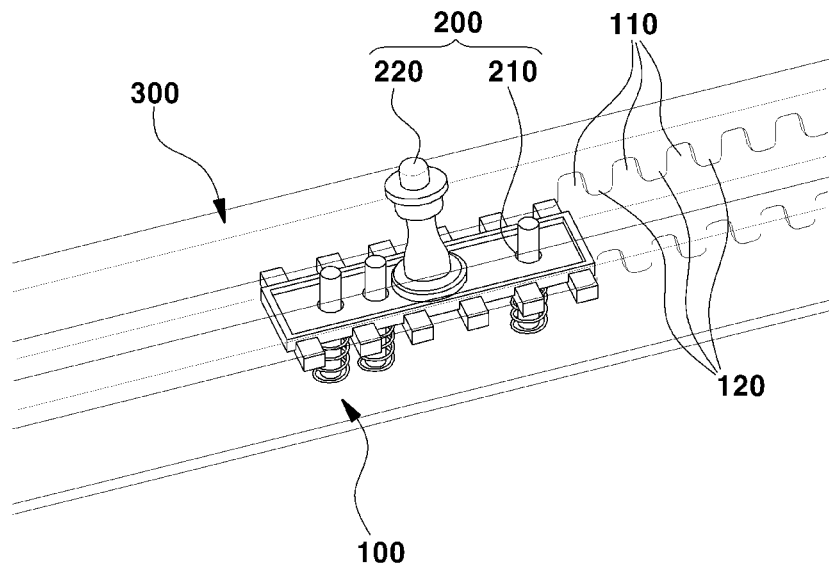
FIG. 2 is a perspective view illustrating a seat-sliding apparatus for a vehicle according to an embodiment of the present invention.

As illustrated in FIG. 2 showing an embodiment of the present invention, the seat-sliding apparatus according to the embodiment of the present invention includes the lower rail 100 and the upper rail 300 configured to be moved along the lower rail 100. The upper rail 300 is provided therein with the locking unit 200, which is operated by a lever and is moved along the lower rail 100 together with the upper rail 300.

The lower rail 100 includes a rail groove portion 110, which is formed in at least one surface of the lower rail 100 that faces the locking unit 200. The rail groove portion 110 is formed in at least a portion of the lower rail 100 in the longitudinal direction of the lower rail 100. Projections of the locking unit 200 are fitted into the grooves in the rail groove portion 110 so as to hold the upper rail 300 and the locking unit 200 on the lower rail 100.

Teeth of the tooth portion are positioned between the plurality of grooves in the rail groove portion 110. When the projections of the locking unit 200 face the teeth of the tooth portion 120, the lower rail 100 and the locking unit 200 are held so as not to be fixed relative to each other. Meanwhile, when the projections of the locking unit 200 are positioned so as to correspond to the grooves in the rail groove portion 110, the projections of the locking unit 200 are fitted into the grooves in the rail groove portion 110 and are held therein.

The locking unit 200 includes a locking plate 210, which is configured to be moved in the lower rail 100, and a center pin 220, which is disposed on the locking plate 210 and extends through the upper rail 300. The center pin 220 is configured to press the locking plate 210 in linkage with manipulation of the lever provided at a seat. The locking plate 210 is configured to release the engagement with the rail groove portion 110 in the lower rail 100 when the locking plate 210 is pressed. Specifically, the locking plate 210 is provided on the rear surface thereof with an elastic member, which is configured to restore the locking plate 210 when the pressing force is released after the locking plate 210 is pressed.

The elastic member is positioned and fixed to the rear surface of the locking plate 210, and is configured to be compressed when the locking plate 210 is moved downwards. Consequently, when the center pin 220 is pressed such that the locking plate 210 is disengaged from the rail groove portion 110 so as to be movable, the elastic member is compressed. Meanwhile, when the force applied to the center pin 220 is removed, the locking plate 210 is restored to the horizontal surface of the lower rail 100 such that the projections are engaged with the grooves in the rail groove portion 110.

The locking unit 200 may include a plurality of projections, which correspond to the grooves in the rail groove portion 110 and are fitted into the grooves in the rail groove portion 110 so as to restrict the movement of the locking unit 200 and the upper rail 300.

The elastic member is positioned on the lower surface of the locking plate 210 so as to elastically bias the locking plate 210 upwards. The elastic member is compressed when the locking plate 210 is pressed by the center pin 220, and restores the locking plate 210 to the normal position thereof when the compression of the elastic member is released. At this time, the projections of the locking plate 210 are restored and fitted into the grooves in the rail groove portion 110 in the lower rail 100. Subsequently, when the manipulation of the lever is released, the locking plate 210 is locked to the lower rail 100.

The elastic member may be disposed at at least a portion of the upper rail 300 and the rear surface of the locking plate 210. When the locking plate 210 is pressed, the elastic member is compressed. When the pressing of the locking plate 210 is released, the elastic member applies elastic force to the rear surface of the locking plate 210 and biases the locking plate 210 upwards.

The rail groove portion 110 is formed in at least a portion of the lower rail 100 such that the grooves in the rail groove portion 110 are arranged in the longitudinal direction of the lower rail 100. The teeth of the tooth portion 120 are formed between the plurality of grooves in the rail groove portion 110, and the projections of the locking plate 210 are fitted between adjacent teeth of the tooth portion 120.

At least one sloped portion 400 is provided at the two ends of the rail groove portion 110. The tooth portion 120, which resides in the sloped portion 400, is a region the width of which decreases moving from one end of the rail groove portion 110. Preferably, at least one sloped portion 400 is provided at each of the two ends of the rail groove portion 110 so as to have a length substantially corresponding to the length of the locking plate 210.

The locking plate 210 is configured so as to maintain the state, in which the projections thereof are not fitted into the grooves in the rail groove portion 110, while the locking plate 210 passes over the sloped portion 400. Subsequently, when the locking unit 200 is moved to a location at which the end of the rail groove portion 110, at which the sloped portion 400 begins, coincides with the rear end of the locking plate 210, the projections on the locking plate 210 are fitted into the grooves in the rail groove portion 110. Accordingly, the inclined angle of the sloped portion 400 may be determined such that a portion of the locking plate 210 is not inserted into the rail groove portion 110 when the portion of the locking plate 210 is located at the sloped portion 400. In other words, when a portion of the locking plate 210 is located at the sloped portion 400, partial fixation of the locking plate 210 is not achieved.

Specifically, the sloped portion 400, which has a width that gradually decreases moving from one end thereof, is configured so as to have a predetermined inclined angle such that some of the projections of the locking plate 210, a portion of which is located in the rail groove portion 110 are not fitted into the rail groove portion 110. More specifically, according to an embodiment of the present invention, the extended line between the two ends of the tooth portion 120, which resides in the sloped portion 400, may be set to have an angle of 1.5 degrees with respect to the horizontal direction of the upper rail 300.

As described above, the sloped portion 400 is configured such that the projection positioned at the front end of the locking plate 210 in the direction of movement of the locking plate 210 is not fitted into a corresponding groove in the rail groove portion 110 before the two ends of the locking unit 200 are completely moved to the rail groove portion 110.

The remaining portion of the rail groove portion 110 excluding the sloped portion 400 is configured such that the teeth thereof have the same height and such that the locking plate 210 is moved over the teeth 120 having the same height. Accordingly, the plurality of projections of the locking plate 210 are held at a selected location.

Figure 3:
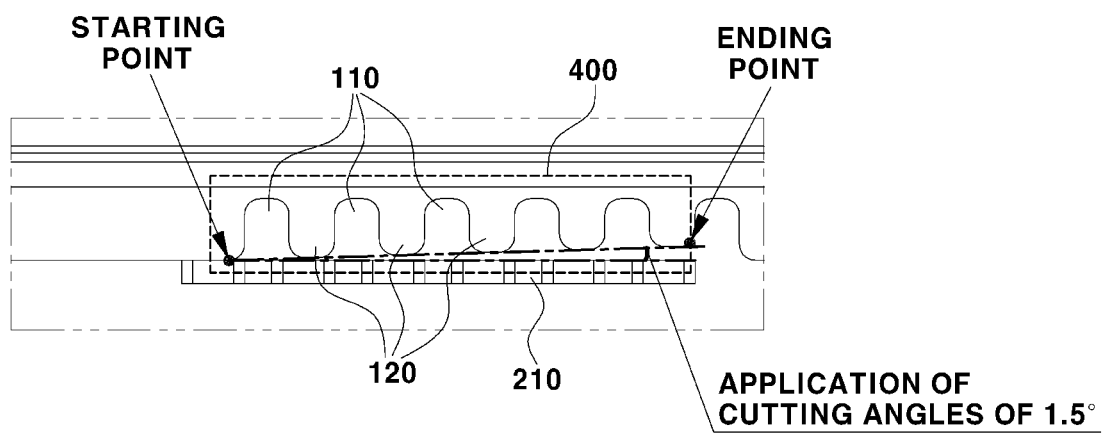
FIG. 3 is a side view illustrating the seat-sliding apparatus for a vehicle according to the embodiment of the present invention.

FIG. 3 is a side cross-sectional view of the lower rail and the locking plate 210 positioned on the lower rail 100 according to an embodiment of the present invention.

As illustrated in the drawing, the seat-sliding apparatus according to the embodiment of the present invention is configured such that, when a portion of the locking plate 210 is positioned at one end of the rail groove portion 110, the locking plate 210 is maintained in the state of not being engaged with the rail groove portion 110.

With regard to FIG. 3, the term "starting point" means one end of the rail groove portion 110, and the term "ending point" means the end of the tooth portion 120 of the other end of the rail groove portion 110, at which the sloped portion 400 is positioned. The teeth of the tooth portion 120 are set such that the heights thereof with respect to the extended line between the starting point and the ending point decrease toward the ending point from the starting point. Specifically, the extended line extending through the end of the tooth portion 120, which is positioned in the sloped portion 400, is inclined at an angle of 1.5 degrees with respect to the horizontal line of the lower rail 100.

The sloped portion 400 may be positioned in the rail groove portion 110 so as to have substantially the same length as the locking plate 210. In other words, when a portion of the locking plate 210 is positioned at the sloped portion 400, the projections of the locking plate 210 are not fitted into the grooves in the rail groove portion 110 by virtue of the slope between the starting point and the ending point. More specifically, the sloped portion 400 may be configured so as to have a length such that the projections on the locking plate 210 are completely fitted into the grooves in the rail groove portion 110 or a length shorter than the above length.

By virtue of the above-described construction of the embodiment of the present invention, the present invention offers the following effects.

The present invention offers an effect of eliminating unpleasant sounds that are generated during movement of the locking unit, by providing the lower rail including the sloped portion.

In addition, the present invention offers an effect of preventing the generation of vibrations during sliding movement of the seat since there is no interference while the locking unit passes over the sloped portion.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A seat-sliding apparatus for a vehicle comprising:
a lower rail fixed to the vehicle;
an upper rail, which is coupled to a seat and slides along the lower rail;
a rail groove portion, which is formed in at least one surface of the lower rail and has therein a plurality of grooves;

a tooth portion having teeth positioned between the grooves in the rail groove portion;

a sloped portion, which is positioned at at least a portion of the rail groove portion and in which heights of the teeth of the tooth portion decrease toward a center of the rail groove portion from one end of the rail groove portion in a longitudinal direction; and a locking unit, which is positioned at the upper rail and is selectively engaged with the rail groove portion so as to hold the upper rail.

2. The seat-sliding apparatus for a vehicle of claim 1, wherein the sloped portion is positioned at one end of the rail groove portion, and has a length corresponding to a length of the locking unit.

3. The seat-sliding apparatus for a vehicle of claim 1, wherein an end of the tooth portion positioned in the sloped portion defines an angle of 1.5 degrees with respect to a horizontal direction of the upper rail.

4. The seat-sliding apparatus for a vehicle of claim 3, wherein a remaining portion of the rail groove portion excluding the sloped portion has teeth having the same height.

5. The seat-sliding apparatus for a vehicle of claim 1, wherein the locking unit is moved along the lower rail without being engaged with the rail groove portion at a zone corresponding to the sloped portion.

6. The seat-sliding apparatus for a vehicle of claim 1, wherein the locking unit includes:

a locking plate, configured to be engaged with the rail groove portion; and a center pin, which is positioned at the locking plate and projects through the upper rail.

7. The seat-sliding apparatus for a vehicle of claim 6, wherein the center pin is moved by a lever positioned at the seat such that the locking plate is pressed by the center pin in linkage with manipulation of the lever, whereby the locking plate is disengaged from the rail groove portion.

8. The seat-sliding apparatus for a vehicle of claim 7, further comprising an elastic member for restoring the locking plate, which is pressed by the center pin, to a normal position when the manipulation of the lever is released.

* * * * *